(12) United States Patent
Lee et al.

(10) Patent No.: US 9,459,479 B2
(45) Date of Patent: Oct. 4, 2016

(54) DISPLAY DEVICE

(71) Applicant: Samsung Display Co., Ltd., Yongin, Gyeonggi-Do (KR)

(72) Inventors: Seon Uk Lee, Seongnam-si (KR); Woo Jae Lee, Yongin-si (KR); Seong Gyu Kwon, Suwon-si (KR); Don Chan Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/271,047

(22) Filed: May 6, 2014

(65) Prior Publication Data
US 2015/0185543 A1 Jul. 2, 2015

(30) Foreign Application Priority Data

Dec. 30, 2013 (KR) ........................ 10-2013-0167564

(51) Int. Cl.
  *G02F 1/1339* (2006.01)
  *G02F 1/1333* (2006.01)
  *G02F 1/1341* (2006.01)

(52) U.S. Cl.
  CPC ....... *G02F 1/133377* (2013.01); *G02F 1/1341* (2013.01)

(58) Field of Classification Search
  USPC .......................... 349/86, 154, 138, 189, 190
  See application file for complete search history.

(56) References Cited

U.S. PATENT DOCUMENTS

| 6,486,930 B1 * | 11/2002 | Kwon | 349/48 |
| 7,074,344 B2 * | 7/2006 | Nakata et al. | 252/299.4 |
| 2012/0062448 A1 | 3/2012 | Kim et al. | |

FOREIGN PATENT DOCUMENTS

KR  1020120026880 A  3/2012

* cited by examiner

*Primary Examiner* — Lucy Chien
(74) *Attorney, Agent, or Firm* — Innovation Counsel LLP

(57) ABSTRACT

A display device includes: a substrate; a thin film transistor; a pixel electrode; a common electrode; a liquid crystal layer; and an encapsulation layer. The thin film transistor is disposed on the substrate. The pixel electrode is disposed on the thin film transistor. The common electrode is disposed on the pixel electrode and is separated from the pixel electrode via a microcavity therebetween. The liquid crystal layer fills the microcavity. The encapsulation layer is configured to seal the microcavity, wherein the encapsulation layer has an opening positioned at a portion overlapping the microcavity.

20 Claims, 16 Drawing Sheets

DISPLAY DEVICE

This application claims priority to and the benefit of Korean Patent Application No. 10-2013-0167564 filed in the Korean Intellectual Property Office on Dec. 30, 2013, the entire contents of which are incorporated herein by reference.

BACKGROUND (a) Technical Field

The present application relates to a display device, more particularly, the present application relates to a display device in which color cross-talk is prevented.

(b) Description of the Related Art

Liquid crystal displays are one of the most widely used flat panel displays. Liquid crystal displays include two panels on which electric field generating electrodes, such as pixel electrodes and a common electrode, are formed, and a liquid crystal layer disposed between the panels. Liquid crystal displays apply a voltage to the electric field generating electrodes to generate an electric field on the liquid crystal layer, determine an arrangement of liquid crystal molecules of the liquid crystal layer, and control the polarization of input light to display an image.

The two display panels forming the liquid crystal display may be a thin film transistor array panel and an opposing display panel. In the thin film transistor array panel, a gate line transmitting a gate signal and a data line transmitting a data signal are formed to be crossed, and a thin film transistor connected to the gate line and the data line and a pixel electrode connected to the thin film transistor may be formed. The opposing display panel may include a light blocking member, a color filter, a common electrode, etc. If necessary, the light blocking member, the color filter, and the common electrode may be formed in the thin film transistor array panel.

However, in a liquid crystal display in the related art, two sheets of substrates are necessarily used, and respective constituent elements are formed on the two sheets of substrates. As a result, there are problems in that the display device is heavy and thick, has a high cost, and has a long processing time.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device having advantages of reducing weight, thickness, cost, and processing time by manufacturing the display device by using one substrate.

Also, a display device in which color cross-talk is prevented is provided.

A display device according to an exemplary embodiment includes: a substrate; a thin film transistor; a pixel electrode; a common electrode; a liquid crystal layer; and an encapsulation layer. The thin film transistor is disposed on the substrate. The pixel electrode is disposed on the thin film transistor. The common electrode is disposed on the pixel electrode and separated from the pixel electrode via a microcavity therebetween. The liquid crystal layer fills the microcavity. The encapsulation layer is configured to seal the microcavity, wherein the encapsulation layer has an opening positioned at a portion overlapping the microcavity.

The microcavity may be disposed in a matrix shape, a first valley may be disposed between microcavities adjacent in a column direction, and a second valley may be disposed between microcavities adjacent in a row direction.

The encapsulation layer may be disposed at the first valley and the second valley.

The encapsulation layer may have a mesh shape.

A light blocking member disposed on the encapsulation layer may be further included.

The light blocking member may have substantially the same plane shape as the encapsulation layer.

A color filter disposed on the common electrode may be further included.

The color filter may be enclosed by the light blocking member and the encapsulation layer.

The encapsulation layer may be disposed at the first valley.

The encapsulation layer may have a bar shape.

A light blocking member disposed on the encapsulation layer may be further included.

The light blocking member may be disposed at the first valley and the second valley.

The light blocking member may have a mesh shape.

The light blocking member may be disposed at the first valley.

The light blocking member may have substantially the same plane shape as the encapsulation layer.

A color filter disposed on the common electrode may be further included, the color filter may include a first color filter and a second color filter, and the first color filter and the second color filter may overlap each other at the second valley.

The encapsulation layer may include a light blocking material;

The encapsulation layer may be disposed at the first valley and the second valley, and may have a mesh shape.

The encapsulation layer may be disposed at the first valley and have a bar shape.

The encapsulation layer may include a material including a photosensitive organic material.

The display device according to an exemplary embodiment has following effects.

The display device according to an exemplary embodiment is manufactured by using one substrate such that weight, thickness, cost, and process time may be reduced.

Also, the encapsulation layer is patterned to reduce the distance between the color filter and the microcavity, thereby preventing color cross-talk.

DETAILED DESCRIPTION OF THE EMBODIMENTS

Figure 1:
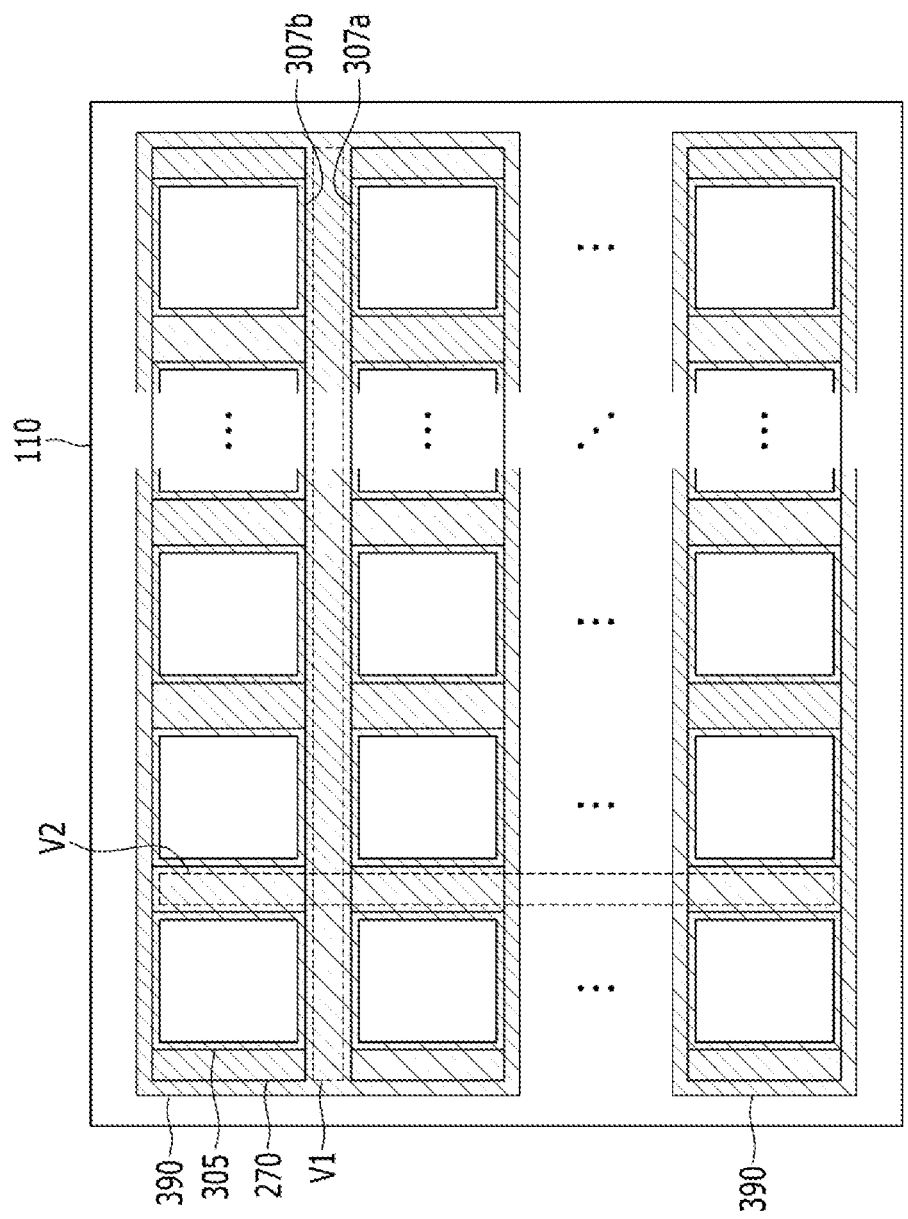
FIG. 1 is a top plan view of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a display device according to an exemplary embodiment will be described with reference to FIG. 1 and FIG. 2.

Figure 2:
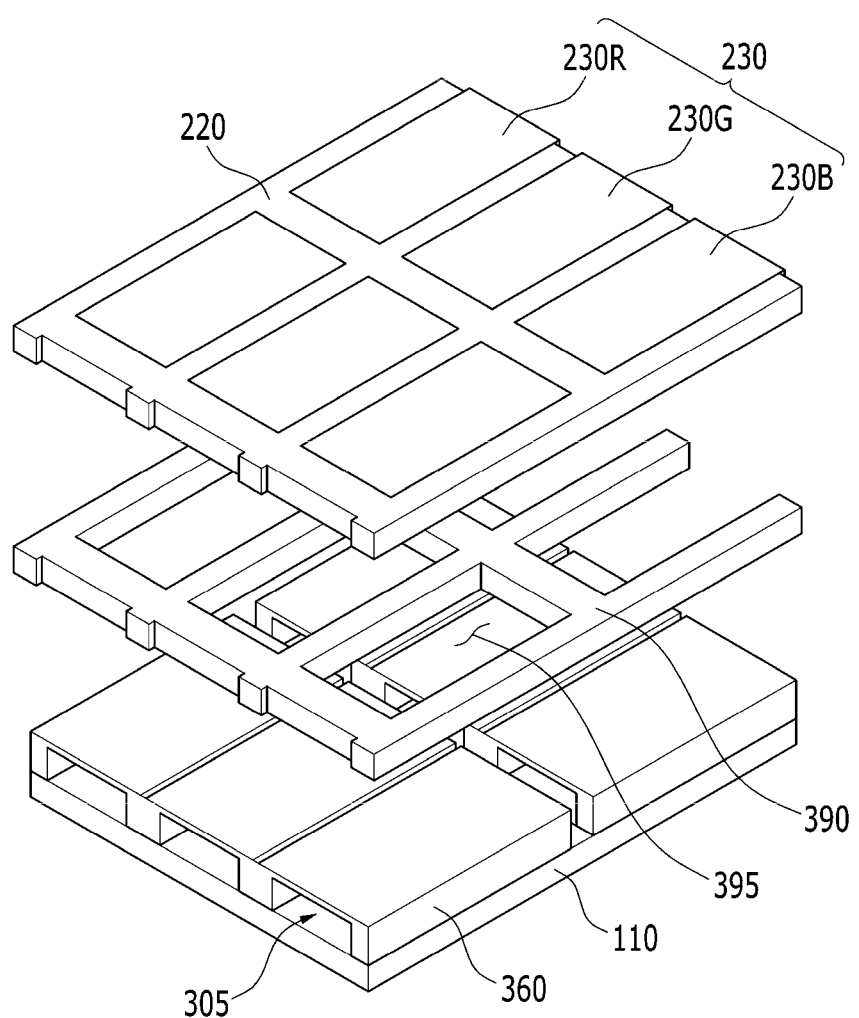
FIG. 2 is an exploded perspective view of a display device according to an exemplary embodiment.

FIG. 1 is a top plan view of a display device according to an exemplary embodiment, and FIG. 2 is an exploded perspective view of a display device according to an exemplary embodiment.

A display device according to an exemplary embodiment includes a substrate 110 made of a material such as glass or plastic.

A microcavity 305 covered by a common electrode 270 is formed on the substrate 110. A common electrode 270 extends in a row direction, and a plurality of microcavities 305 are formed under the common electrode 270.

The microcavities 305 may be arranged in a matrix form, and a first valley V1 is positioned between the microcavities 305 adjacent in a row direction, and a second valley V2 is positioned between the microcavities 305 adjacent in a column direction.

A plurality of common electrodes 270 may be separated from each other with the first valley V1 interposed therebetween. That is, the common electrodes 270 are not formed at the first valley V1. A portion of the edge of the microcavity 305 is not covered by the common electrode 270 to be exposed. For example, the side of the microcavity 305 adjacent to the first valley V1 may be exposed. That is, the sides of two edges of the microcavity 305 facing each other may be exposed. The portions where the microcavity 305 is exposed are referred to as injection holes 307a and 307b.

Two injection holes 307a and 307b may be formed for one microcavity 305. However, the present embodiment is not limited thereto, and one injection hole may be formed at one microcavity 305, or three or more injection holes may be formed.

Each common electrode 270 is formed to be separated from the substrate 110 between the adjacent second valleys V2, thereby forming the microcavity 305. That is, the common electrode 270 is formed to cover the remaining sides of the microcavity 305 except for the sides where the injection holes 307a and 307b are formed. For example, the common electrode 270 may be formed to cover a side of a left edge and a side of a right edge of the microcavity 305.

An encapsulation layer 390 (encapsulation layer) is formed at the first valley V1 and the second valley V2, and the encapsulation layer 390 covers the injection holes 307a and 307b to encapsulate the microcavity 305. The encapsulation layer 390 may be formed with a mesh shape.

The encapsulation layer 390 has an opening 395 positioned at the portion overlapping the microcavity 305. The encapsulation layer 390 is not formed in the entire region on the substrate 110 and is patterned for the portion overlapping the microcavity 305 to be removed. An opening 395 may be formed with similar shape to that of the microcavity 305.

The encapsulation layer 390 may partially overlap the common electrode 270. For example, the encapsulation layer 390 may overlap the common electrode 270 at the second valley V2. The encapsulation layer 390 may overlap the edge of the microcavity 305. The encapsulation layer 390 does not overlap the microcavity 305 except at the edge of the microcavity 305.

A light blocking member 220 is formed on the encapsulation layer 390. The light blocking member 220 may be formed at the first valley V1 and the second valley V2 and may have the mesh shape. The light blocking member 220 may have substantially the same plane shape as the encapsulation layer 390.

A color filter 230 is formed on the common electrode 270. The color filter 230 is formed to overlap the microcavity 305. A plurality of color filters 230 are independently formed on each microcavity 305 and do not overlap each other. The color filter 230 is enclosed by the light blocking member 220 and the encapsulation layer 390.

The aforementioned structure of the display device according to the exemplary embodiment is just an example, and various modifications are feasible. For example, a disposition form of the microcavity 305, the first valley V1, and the second valley V2 may be changed, the plurality of common electrodes 270 may be connected to each other in the first valley V1, and a portion of each common electrode 270 may be formed to be spaced apart from the substrate 110 in the second valley V2 to connect the adjacent microcavities 305 to each other.

Hereinafter, one pixel of the display device according to the exemplary embodiment will be schematically described with reference to FIG. 3.

Figure 3:
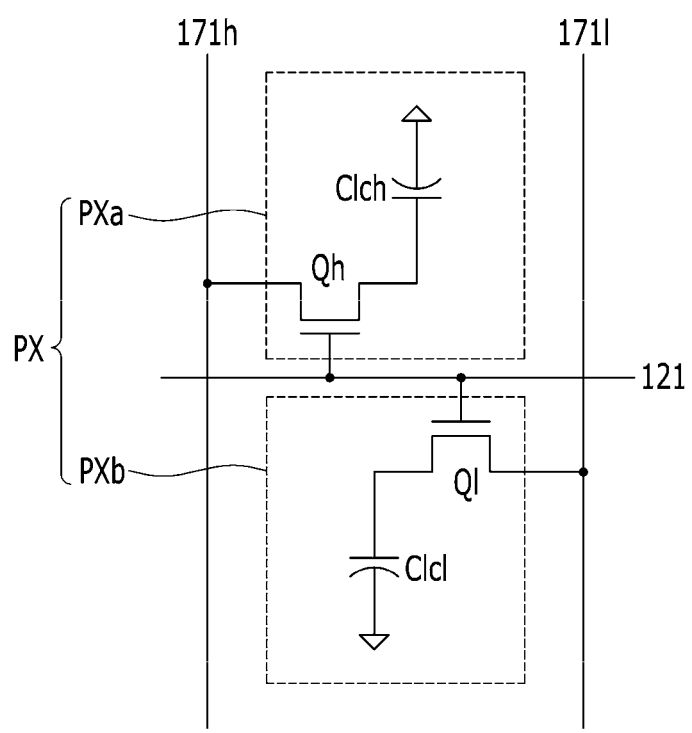
FIG. 3 is an equivalent circuit diagram of one pixel of a display device according to an exemplary embodiment.

FIG. 3 is an equivalent circuit diagram of one pixel of the display device according to the exemplary embodiment.

The display device according to the exemplary embodiment includes a plurality of signal lines 121, 171h, and 171l, and a plurality of pixels PX connected to the plurality of signal lines 121, 171h, and 171l. Although not shown, the plurality of pixels PX may be arranged in a matrix form including a plurality of pixel rows and a plurality of pixel columns.

Each pixel PX may include a first subpixel PXa and a second subpixel PXb. The first subpixel PXa and the second subpixel PXb may be vertically disposed. In this case, the first valley V1 may be positioned in a direction of a pixel row between the first subpixel PXa and the second subpixel PXb, and the second valley V2 may be positioned between the plurality of pixel columns.

The signal lines 121, 171h, and 171l include a gate line 121 for transmitting a gate signal, and a first data line 171h and a second data line 171l for transmitting different data voltages.

The display device according to the exemplary embodiment includes a first switching element Qh connected to the gate line 121 and the first data line 171h, and a second switching element Ql connected to the gate line 121 and the second data line 171l.

A first liquid crystal capacitor Clch connected with the first switching element Qh is formed in the first subpixel PXa, and a second liquid crystal capacitor Clcl connected with the second switching element Ql is formed in the second subpixel PXb.

A first terminal of the first switching element Qh is connected with the gate line 121, a second terminal thereof is connected with the first data line 171h, and a third terminal thereof is connected to the first liquid crystal capacitor Clch.

A first terminal of the second switching element Ql is connected with the gate line 121, a second terminal thereof is connected with the second data line 171l, and a third terminal thereof is connected to the second liquid crystal capacitor Clcl.

An operation of the liquid crystal display according to the exemplary embodiment will now be described. When a gate-on voltage is applied to the gate line 121, the first switching element Qh and the second switching element Ql connected to the gate line 121 are turned on, and the first and second liquid crystal capacitors Clch and Clcl are charged with different data voltages transmitted through the first and second data lines 171h and 171l. The data voltage transmitted by the second data line 171l is lower than the data voltage transmitted by the first data line 171h. Accordingly, the second liquid crystal capacitor Clcl is charged with a lower voltage than that of the first liquid crystal capacitor Clch, thereby improving side visibility.

Hereinafter, a structure of one pixel of the liquid crystal display according to the exemplary embodiment will be described with reference to FIG. 4 to FIG. 6.

Figure 4:
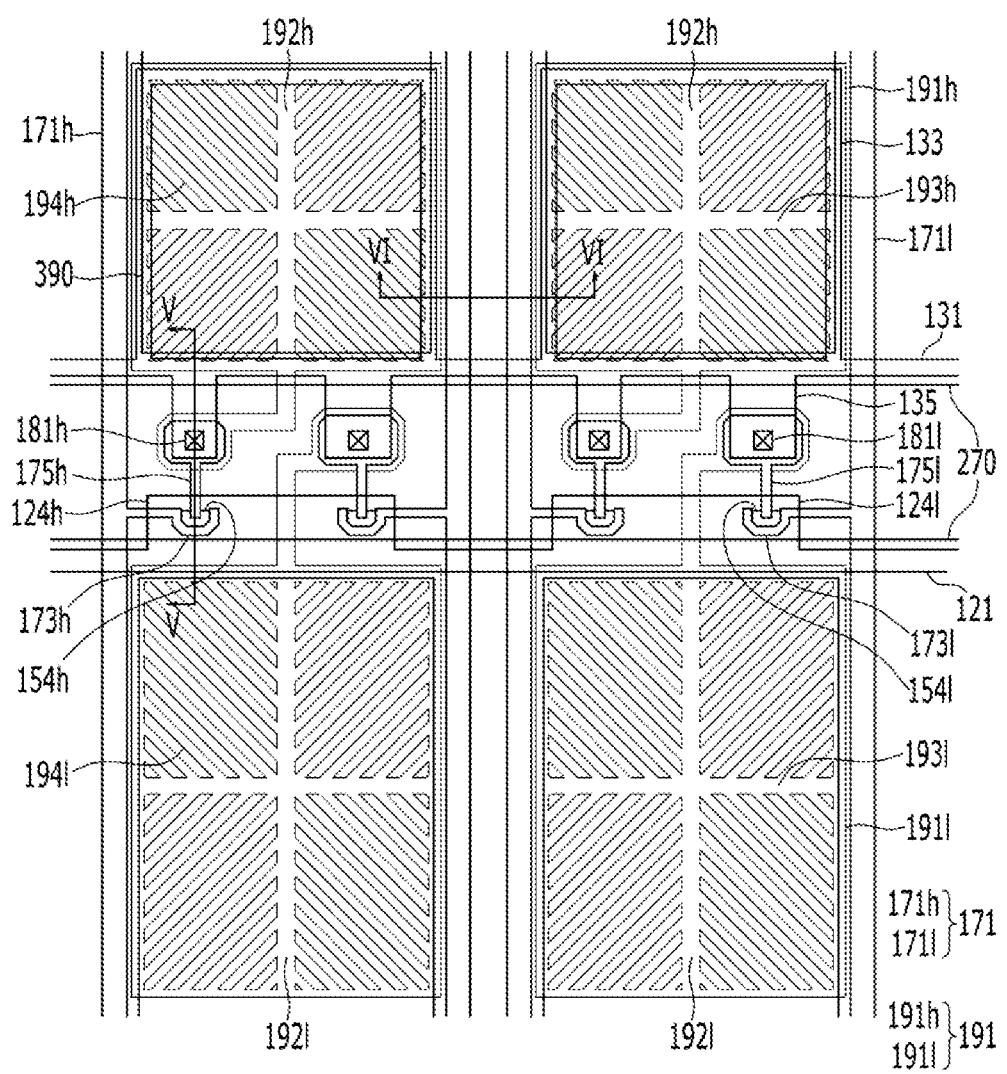
FIG. 4 is a top plan view of a portion of a display device according to an exemplary embodiment.
Figure 5:
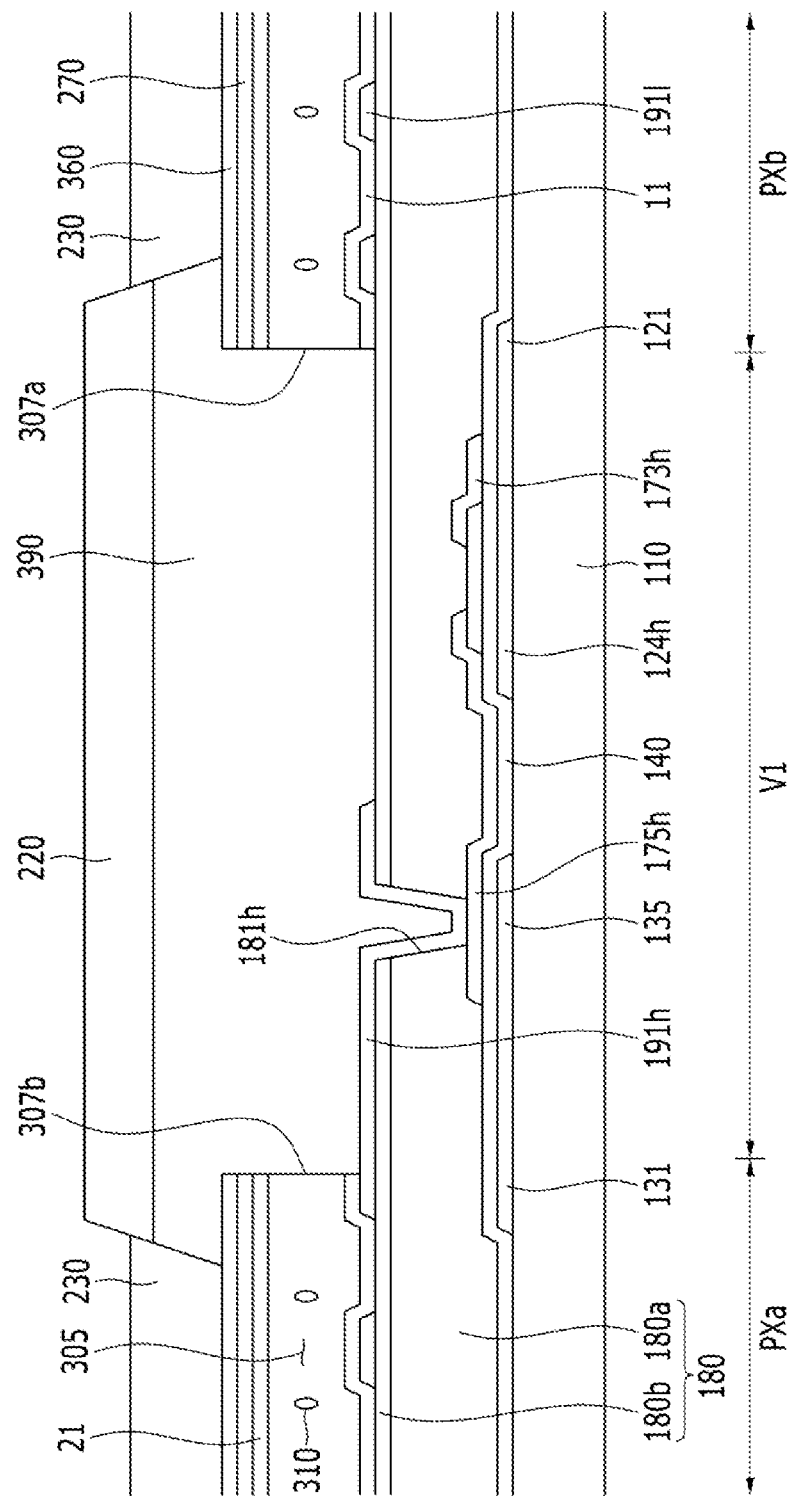
FIG. 5 is a cross-sectional view of the display device of FIG. 4 taken along the line V-V according to an exemplary embodiment.
Figure 6:
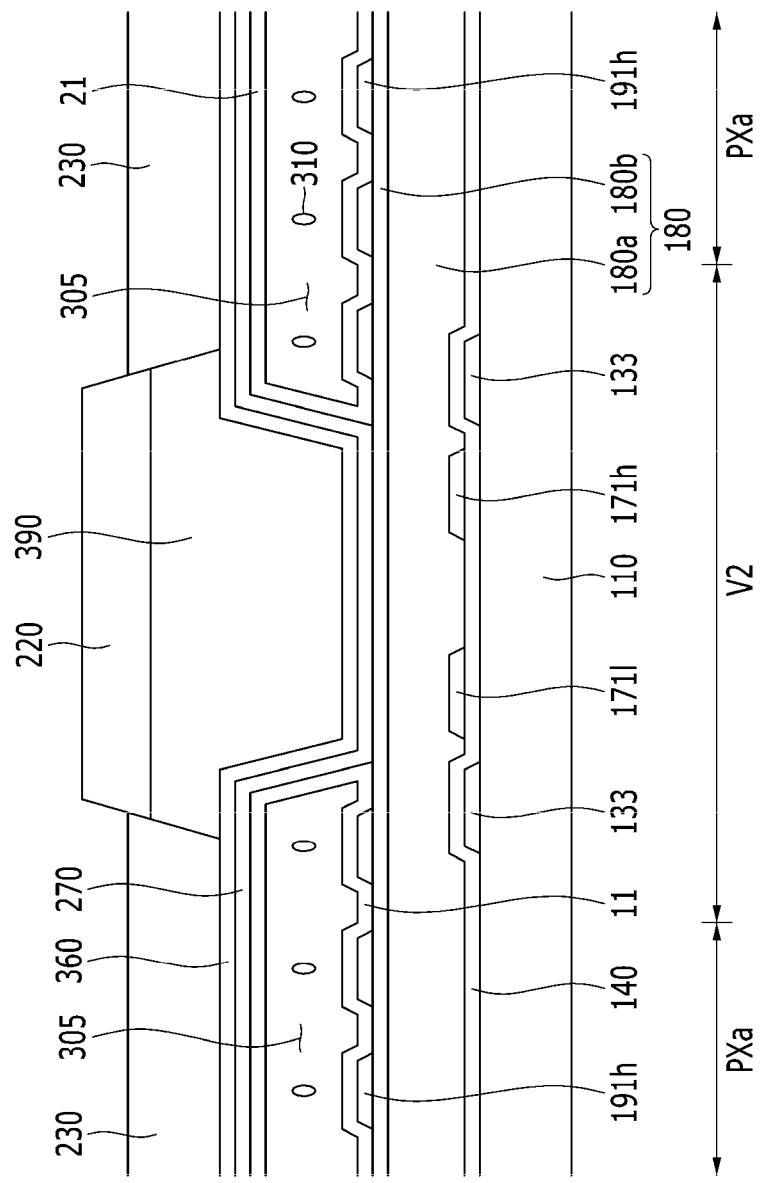
FIG. 6 is a cross-sectional view of the display device of FIG. 4 taken along the line VI-VI according to an exemplary embodiment.

FIG. 4 is a top plan view of a portion of a display device according to an exemplary embodiment, FIG. 5 is a cross-sectional view of the display device of FIG. 4 taken along the line V-V according to an exemplary embodiment, and FIG. 6 is a cross-sectional view of the display device of FIG. 4 taken along the line VI-VI according to an exemplary embodiment.

Referring to FIG. 4 to FIG. 6, the gate line 121 and first and second gate electrodes 124h and 124l protruding from the gate line 121 are formed on the substrate 110.

The gate line 121 mainly extends in a first direction, and transmits a gate signal. The gate line 121 is positioned between the two microcavities 305 which are adjacent in a column direction. That is, the gate line 121 is positioned at the first valley V1. The first gate electrode 124h and the second gate electrode 124l upwardly protrude in a plane view at an upper side of the gate line 121. The first gate electrode 124h and the second gate electrode 124l are connected to each other to form one protrusion. However, the present embodiment is not limited thereto, and the protruding form of the first gate electrode 124h and the second gate electrode 124l may be variously modified.

A storage electrode line 131 and storage electrodes 133 and 135 protruding from the storage electrode line 131 may be further formed on the substrate 110.

The storage electrode line 131 extends in a direction parallel to the gate line 121, and is formed to be spaced apart from the gate line 121. The storage electrode line 131 may be formed substantially with the same layer and material as the gate line 121. The storage electrode 133 protruded on the storage electrode line 131 is formed to enclose an edge of the first subpixel PXa. The storage electrode 135 protruded under the storage electrode line 131 is formed to be adjacent to the first gate electrode 124h and the second gate electrode 124l. A predetermined voltage may be applied to the storage electrode line 131.

A gate insulating layer 140 is formed on the gate line 121, the first gate electrode 124h, the second gate electrode 124l, the storage electrode line 131, and the storage electrodes 133 and 135. The gate insulating layer 140 may be formed of an inorganic insulating material, such as a silicon nitride (SiNx) and a silicon oxide (SiOx). Further, the gate insulating layer 140 may be formed of a single layer or a multilayer.

A first semiconductor 154h and a second semiconductor 154l are formed on the gate insulating layer 140. The first semiconductor 154h may be positioned on the first gate electrode 124h, and the second semiconductor 154l may be positioned on the second gate electrode 124l. The first semiconductor 154h may be elongated under the first data line 171h, and the second semiconductor 154l may be elongated under the second data line 171l. The first semiconductor layer 154h and the second semiconductor 154l may be formed of amorphous silicon, polycrystalline silicon, a metal oxide, or the like.

An ohmic contact member (not illustrated) may be formed on each of the first semiconductor 154h and the second semiconductor 154l. The ohmic contact members may be made of a silicide or a material such as n+ hydrogenated amorphous silicon in which an n-type impurity is doped at a high concentration.

The first data line 171h, the second data line 171l, a first source electrode 173h, a first drain electrode 175h, a second source electrode 173l, and a second drain electrode 175l are formed on the first semiconductor 154h, the second semiconductor 154l, and the gate insulating layer 140.

The first data line 171h and the second data line 171l transfer a data signal, and mainly extend in a vertical direction to cross the gate line 121 and the storage electrode line 131. The data lines 171h, 171l and generally each data line 171 is positioned between the two microcavities 305 which are adjacent in the row direction. That is, the data line 171 is positioned at the second valley V2.

The first data line 171h and the second data line 171l transmit different data voltages. The data voltage transmitted by the second data line 171l is lower than the data voltage transmitted by the first data line 171h. In contrast, the data voltage transmitted by the second data line 171l may be higher than the data voltage transmitted by the first data line 171h.

The first source electrode 173h is formed to protrude above the first gate electrode 124h from the first data line 171h, and the second source electrode 173l is formed to protrude above the second gate electrode 124l from the second data line 171l. Each of the first drain electrode 175h and the second drain electrode 175l has one wide end portion and the other rod-shaped end portion. The wide end portions of the first drain electrode 175h and the second drain electrode 175l overlap the storage electrode 135 downwardly protruding from the storage electrode line 131. Each of the rod-shaped end portions of the first drain electrode 175*h* and the second drain electrode 175*l* is partially surrounded by the first source electrode 173*h* and the second source electrode 173*l*.

The first and second gate electrodes 124*h* and 124*l*, the first and second source electrodes 173*h* and 173*l*, and the first and second drain electrodes 175*h* and 175*l* form first and second thin film transistors (TFT) Qh and Ql together with the first and second semiconductors 154*h* and 154*l*, and channels of the thin film transistors are formed in the semiconductors 154*h* and 154*l* between the source electrodes 173*h* and 173*l* and the drain electrodes 175*h* and 175*l*, respectively.

A passivation layer 180 is formed on the first semiconductor 154*h* exposed between the first data line 171*h*, the second data line 171*l*, the first source electrode 173*h*, the first drain electrode 175*h*, the first source electrode 173*h*, and the first drain electrode 175*h*, and the second semiconductor 154*l* exposed between the second source electrode 173*l*, the drain electrode 175*l*, the second source electrode 173*l*, and the second drain electrode 175*l*.

The passivation layer 180 may be formed of a lower passivation layer 180*a* and an upper passivation layer 180*b* formed on the lower passivation layer 180*a*. The lower passivation layer 180*a* is formed of an organic insulating material thereby having a function on flattening an upper surface of the substrate 110 including the thin film transistors Qh and Ql. The upper passivation layer 180*b* is formed of an inorganic insulating material thereby having a function of protecting the lower passivation layer 180*a*.

In the above, the passivation layer 180 is formed with the dual structure, however the present embodiment is not limited thereto. The passivation layer 180 may be formed of a single layer or multiple layers of three or more.

In the passivation layer 180, a first contact hole 181*h* is formed to extend to and expose the wide end portion of the first drain electrode 175*h*, and a second contact hole 181*l* is formed to extend to and expose the wide end portion of the second drain electrode 175*l*.

A pixel electrode 191 is formed on the passivation layer 180. The pixel electrode 191 may be made of a transparent metal material such as indium tin oxide (ITO) and indium zinc oxide (IZO).

The pixel electrode 191 includes a first subpixel electrode 191*h* and a second subpixel electrode 191*l* which are separated from each other with the gate line 121 and the storage electrode line 131 therebetween. The first subpixel electrode 191*h* and the second subpixel electrode 191*l* are disposed above and below the pixel PX based on the gate line 121 and the storage electrode line 131. That is, the first subpixel electrode 191*h* and the second subpixel electrode 191*l* are separated from each other with the first valley V1 therebetween, the first subpixel electrode 191*h* is positioned in the first subpixel PXa, and the second subpixel electrode 191*l* is positioned in the second subpixel PXb. However, the arrangement shape of the first subpixel electrode 191*h* and the second subpixel electrode 191*l* is not limited thereto, and may be variously changed.

The first subpixel electrode 191*h* is connected to the first drain electrode 175*h* through the first contact hole 181*h*, and the second subpixel electrode 191*l* is connected to the second drain electrode 175*l* through the second contact hole 181*l*. Accordingly, when the first thin film transistor Qh and the second thin film transistor Ql are in an on state, the first subpixel electrode 191*h* and the second subpixel electrode 191*l* receive different data voltages from those of the first drain electrode 175*h* and the second drain electrode 175*l*, respectively. An electric field may be formed between the pixel electrode 191 and the common electrode 270.

An overall shape of each of the first subpixel electrode 191*h* and the second subpixel electrode 191*l* is a quadrangle, and the first subpixel electrode 191*h* and the second subpixel electrode 191*l* include cross-shaped stem portions formed of horizontal stem portions 193*h* and 193*l* and vertical stem portions 192*h* and 192*l* crossing the horizontal stem portions 193*h* and 193*l*. Further, each of the first subpixel electrode 191*h* and the second subpixel electrode 191*l* includes a plurality of minute branch portions 194*h* and 194*l*.

The pixel electrode 191 is divided into four subregions by the horizontal stem portions 193*h* and 193*l* and the vertical stem portions 192*h* and 192*l*. The minute branch portions 194*h* and 194*l* obliquely extend from the horizontal stem portions 193*h* and 193*l* and the vertical stem portions 192*h* and 192*l*, and the extension direction may form an angle of approximately 45° or 135° with the gate line 121 or the horizontal stem portions 193*h* and 193*l*. Further, the directions in which the minute branch portions 194*h* and 194*l* in the adjacent two subregions extend may be orthogonal to each other.

In the present exemplary embodiment, the first subpixel electrode 191*h* and the second subpixel electrode 191*l* may further include outer stem portions surrounding outer sides of the first subpixel PXa and the second subpixel PXb, respectively.

The arrangement form of the pixel, the structure of the thin film transistor, and the shape of the pixel electrode described above are one example, but the present embodiment is not limited thereto, and various modifications are feasible.

The common electrode 270 is formed on the pixel electrode 191 to be separated from the pixel electrode 191 by a predetermined distance. The microcavity 305 is formed between the pixel electrode 191 and the common electrode 270. That is, the microcavity 305 is enclosed by the pixel electrode 191 and the common electrode 270.

The common electrode 270 is formed in the row direction and is disposed on the microcavity 305 and at the second valley V2. The common electrode 270 is formed to cover the upper surface and the side of the microcavity 305 thereby having a function of maintaining a shape of the microcavity 305. Accordingly, the shape of the microcavity 305 may be determined by the common electrode 270. The transverse and longitudinal width and the height of the microcavity 305 may be variously changed according to a size of the display device and a resolution.

The common electrode 270 may be made of a transparent metal material such as indium tin oxide (ITO) and indium zinc oxide (IZO). The common electrode 270 may be applied with a predetermined voltage, and the electric field may be formed between the pixel electrode 191 and the common electrode 270.

A first alignment layer 11 is formed on the pixel electrode 191. The first alignment layer 11 may be formed directly on the passivation layer 180 that is not covered by the pixel electrode 191.

A second alignment layer 21 facing the first alignment layer 11 is formed under the common electrode 270.

The first alignment layer 11 and the second alignment layer 21 may be formed of vertical alignment layers, and may be formed of an alignment material such as polyamic acid, polysiloxane, and polyimide. The first and second alignment layers 11 and 21 may be connected on a side wall of the edge of the microcavity 305.

A liquid crystal layer formed of liquid crystal molecules 310 is formed in the microcavity 305 positioned between the pixel electrode 191 and the common electrode 270. The liquid crystal molecules 310 have negative dielectric anisotropy, and may be erected in a vertical direction on the substrate 110 in a state where an electric field is not applied. That is, vertical alignment may be implemented.

The first subpixel electrode 191h and the second subpixel electrode 191l, to which the data voltage is applied, generate an electric field together with the common electrode 270 to determine a direction of the liquid crystal molecules 310 positioned in the microcavity 305 between the two electrodes 191 and 270. Luminance of light passing through the liquid crystal layer is changed according to the thusly determined direction of the liquid crystal molecules 310.

A roof layer 360 may be further formed on the common electrode 270. The roof layer 360 may be formed of the inorganic insulating material such as a silicon nitride (SiNx) and a silicon oxide (SiOx). The roof layer 360 is formed in the row direction and is disposed on the microcavity 305 and at the second valley V2. The roof layer 360 may have substantially the same plane shape as the common electrode 270.

The common electrode 270 and the roof layer 360 are formed to uncover and expose the edge of the microcavity 305, and the portion where the microcavity 305 is not covered by the common electrode 270 and the roof layer 360 is referred to as injection holes 307a and 307b. The injection holes 307a and 307b includes a first injection hole 307a extending to and exposing the side of the first edge of the microcavity 305 and a second injection hole 307b extending to and exposing the side of the second edge of the microcavity 305. The first edge and the second edge face each other, and for example, in the plane view, the first edge may be an upper edge of the microcavity 305 and the second edge may be a lower edge of the microcavity 305. The microcavities 305 are exposed by the injection holes 307a and 307b so that an alignment solution, a liquid crystal material, or the like may be injected into the microcavities 305 through the injection holes 307a and 307b.

The encapsulation layer 390 is formed on the roof layer 360. The encapsulation layer 390 is formed to cover the injection holes 307a and 307b exposing the portion of the microcavity 305 to the outside. That is, the encapsulation layer 390 may seal the microcavity 305 so that the liquid crystal molecules 310 formed in the microcavity 305 are not discharged to the outside.

The encapsulation layer 390 may be formed at the first valley V1 and the second valley V2, and may be formed to overlap the edge of the microcavity 305. The encapsulation layer 390 may overlap all four edges of the microcavity 305. The encapsulation layer 390 does not overlap the microcavity 305 except for the edges of the microcavity 305. The encapsulation layer 390 does not overlap the center of the microcavity 305. The encapsulation layer 390 is formed with a mesh shape to enclose the edges of the microcavity 305.

The encapsulation layer 390 contacts the liquid crystal molecules 310 such that it is preferably made of a material that does not react with the liquid crystal molecules 310. Also, the encapsulation layer 390 may be formed of a material including a photosensitive organic material. At this time, if a mask is aligned on the encapsulation layer 390 and a light is irradiated, the photosensitive organic material is reacted by the light such that the encapsulation layer 390 may be patterned by only a photo-process. Also, even if the encapsulation layer 390 does not include the photosensitive material, the patterning is possible. That is, a photosensitive film may be separately formed on the encapsulation layer 390, the photosensitive film may be patterned by the photo-process, and the encapsulation layer 390 may be etched by using the patterned photosensitive film.

The encapsulation layer 390 may be made as a multilayer such as a dual layer or a triple layer. The dual layer includes two layers made of different materials. The triple layer includes three layers, and materials of two adjacent layers are different from each other. For example, the encapsulation layer 390 may include a layer made of the organic insulating material and a layer made of the inorganic insulating material.

The light blocking member 220 is formed on the encapsulation layer 390. The light blocking member 220 is made of a light blocking material, thereby having a function of preventing light leakage. The light blocking member 220 may be formed at the first valley V1 and the second valley V2, thereby forming the mesh shape. The light blocking member 220 may have substantially the same plane shape as the encapsulation layer 390.

The thin film transistors Qh and Ql are positioned in the first valley V1, and the light blocking member 220 is formed to overlap the thin film transistors Qh and Ql. Further, the light blocking member 220 may be formed to additionally overlap the gate line 121 and the storage electrode line 131. The light blocking member 220 may be prevented from being recognized by generating reflection light by a member made of a metal material.

The color filter 230 is formed on the roof layer 360 to overlap each microcavity 305. The color filter 230 may include a first color filter 230R, a second color filter 230G, and a third color filter 230B. At this time, the first color filter 230R, the second color filter 230G, and the third color filter 230B may respectively display three primary colors of red, green, and blue. A plurality of color filters 230 do not overlap each other.

In an exemplary embodiment, the encapsulation layer 390 is patterned such that the portion overlapping the microcavity 305 is removed. Accordingly, compared with a case that the encapsulation layer 390 is formed on the whole surface of the substrate 110, a distance between the color filter 230 and the microcavity 305 may be small. When the distance between the color filter 230 and the microcavity 305 is not small, the green filter may be recognized as blue when viewing the green filter at the side. In an exemplary embodiment, by shortening the distance between the color filter 230 and the microcavity 305, the color cross-talk may be prevented.

The color filter 230 is enclosed by the light blocking member 220 and the encapsulation layer 390. The color filter 230 is shown to be in contact with the light blocking member 220 and the side of the encapsulation layer 390 and to almost overlap the light blocking member 220. However, the present embodiment is not limited thereto, and the edge of the color filter 230 and the edge of the light blocking member 220 may overlap each other. The color filter 230 may not be formed at the first valley V1.

In the above, the color filter 230 includes the color filters representing red, green, and blue, however the present embodiment is not limited thereto, and color filters 230 representing different colors may be included. For example, the color filter 230 may include cyan, magenta, yellow, and a white-based color.

Although not illustrated in the drawings, a polarizer may be further formed on upper and lower surfaces of the display device. The polarizer may include a first polarizer and a second polarizer. The first polarizer may be attached to a lower surface of the substrate 110, and the second polarizer may be attached onto the color filter 230 and the light blocking member 220.

Next, a display device according to an exemplary embodiment will be described with reference to FIG. 7 to FIG. 10.

The display device according to the exemplary embodiment shown in FIG. 7 to FIG. 10 is almost the same as the display device according to an exemplary embodiment shown in FIG. 1 to FIG. 6 such that the description thereof is omitted. In the present exemplary embodiment, the encapsulation layer is formed of the bar shape, differently from the previous exemplary embodiment, and it will be described in detail.

Figure 7:
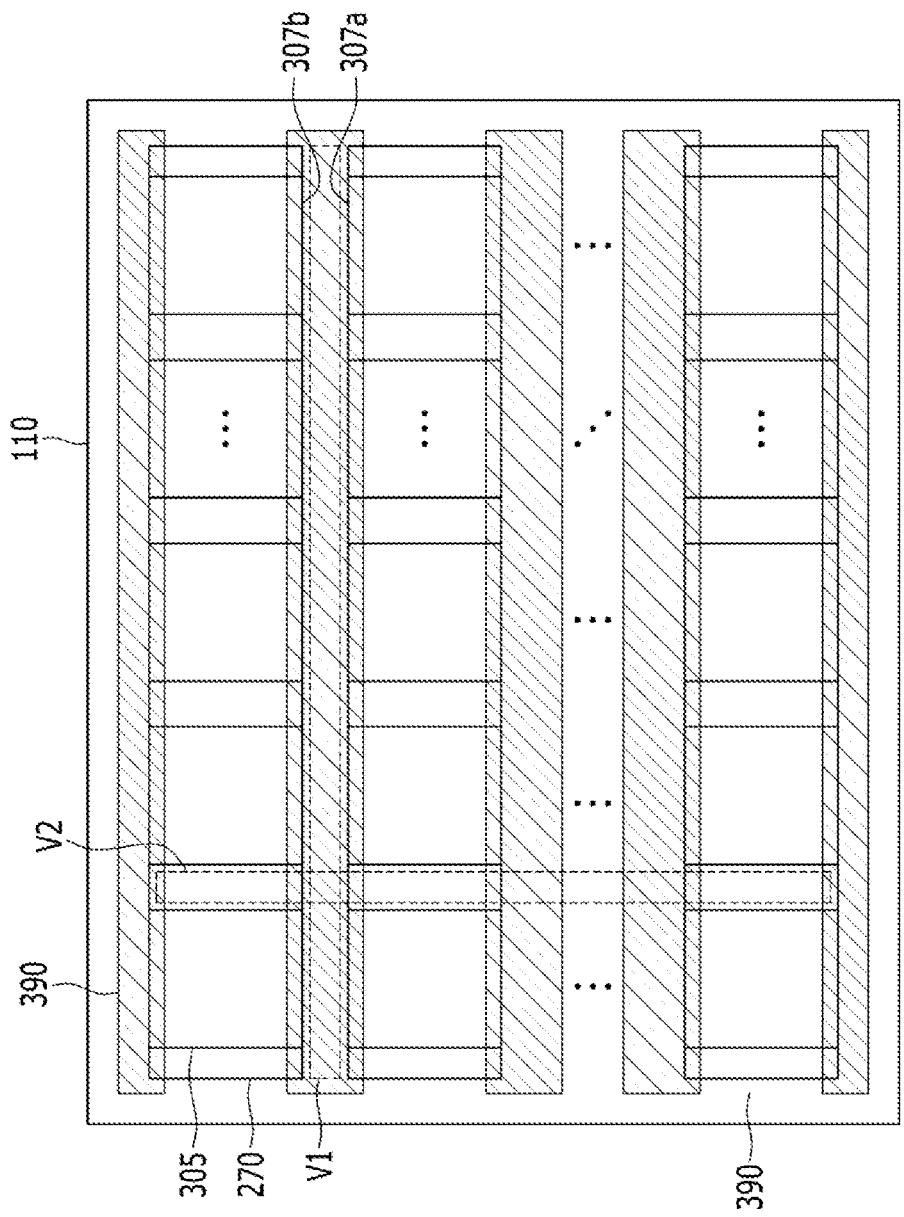
FIG. 7 is a top plan view of a display device according to an exemplary embodiment.
Figure 8:
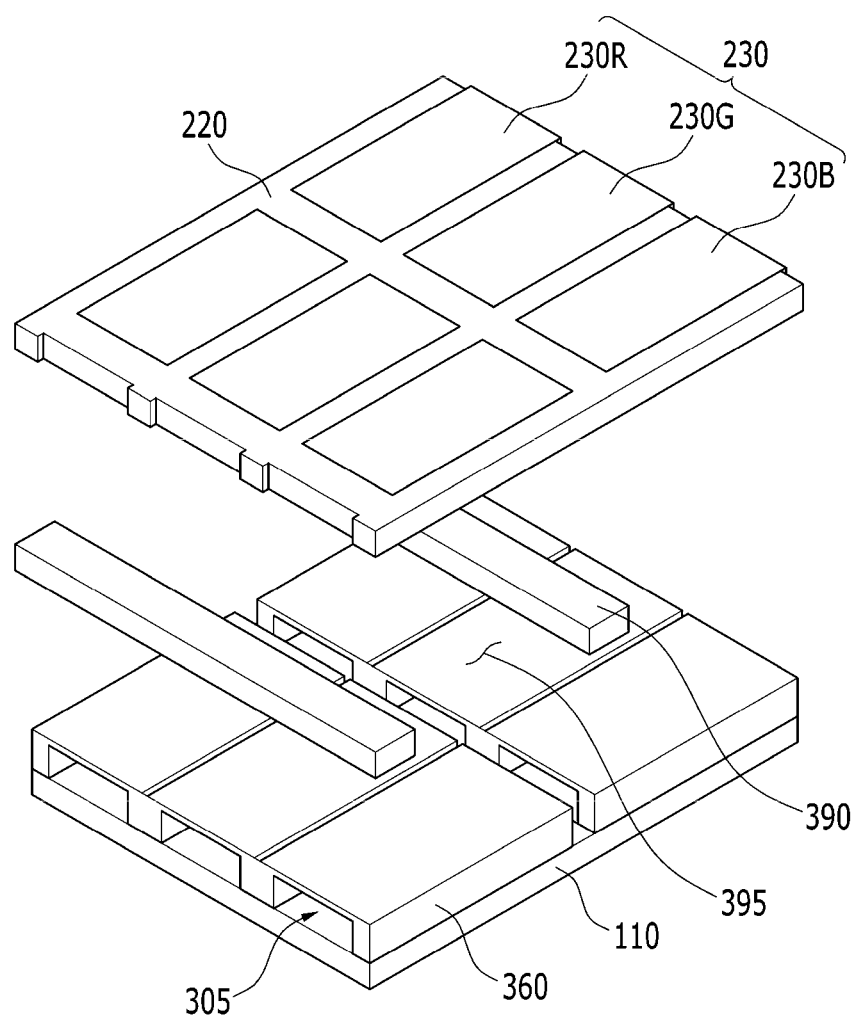
FIG. 8 is an exploded perspective view of a display device according to an exemplary embodiment.
Figure 9:
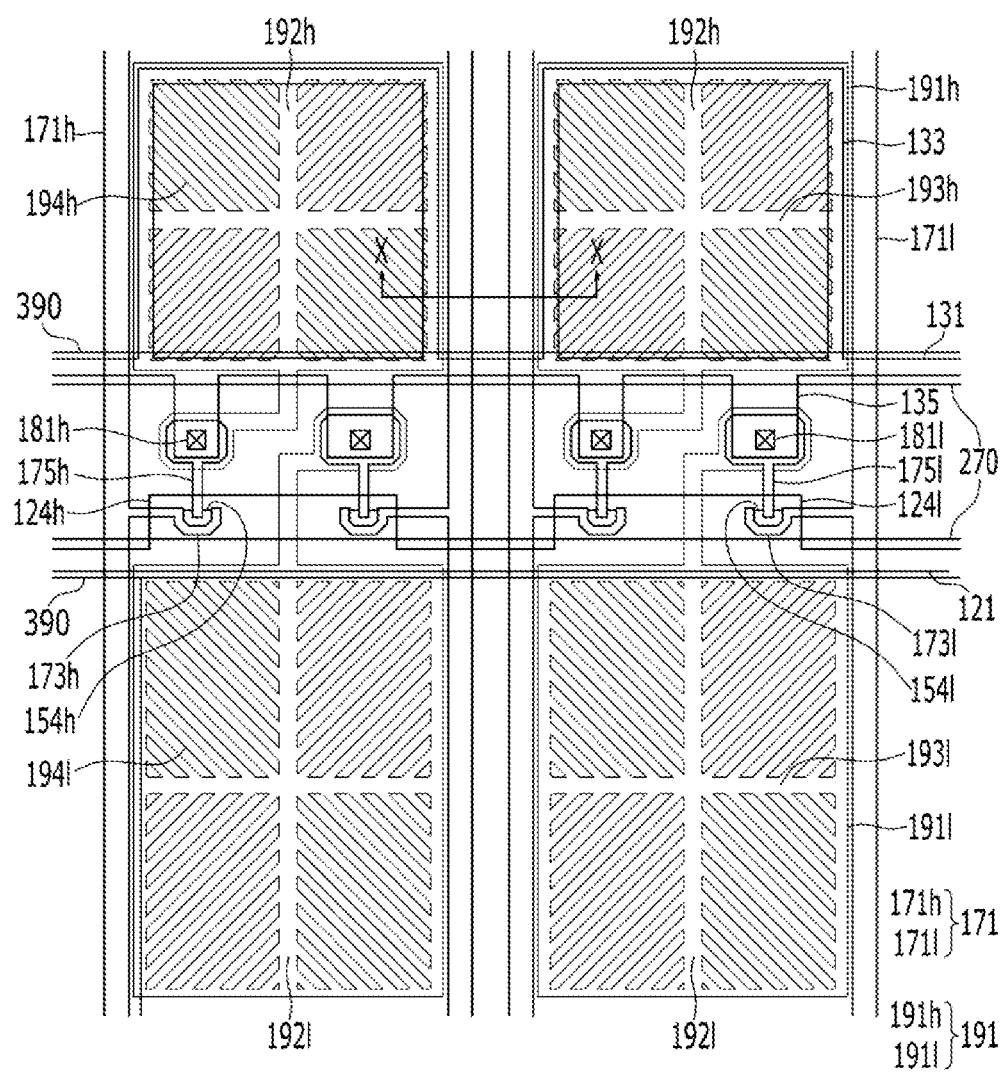
FIG. 9 is a top plan view of a portion of a display device according to an exemplary embodiment.
Figure 10:
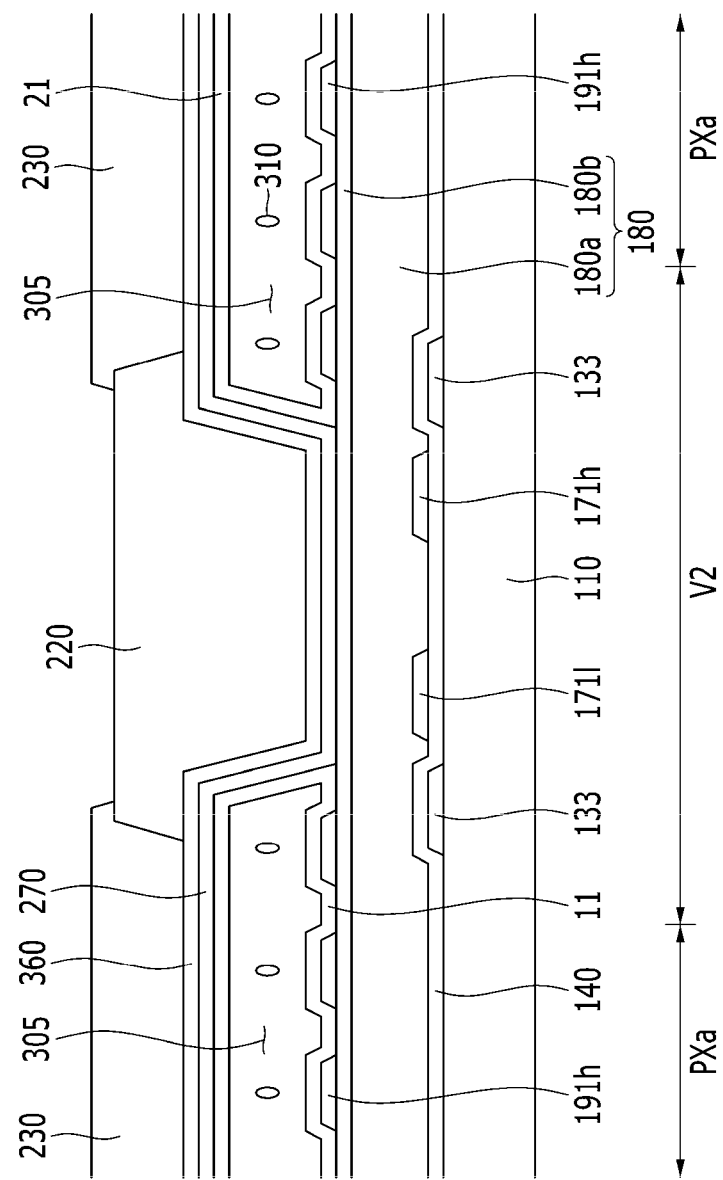
FIG. 10 is a cross-sectional view of the display device of FIG. 9 taken along the line X-X according to an exemplary embodiment.

FIG. 7 is a top plan view of a display device according to an exemplary embodiment, and FIG. 8 is an exploded perspective view of a display device according to an exemplary embodiment. FIG. 9 is a top plan view of a portion of a display device according to an exemplary embodiment, and FIG. 10 is a cross-sectional view of the display device of FIG. 9 taken along the line X-X according to an exemplary embodiment.

In the previous exemplary embodiment, the encapsulation layer 390 is formed of the mesh shape to be crossed in the row direction and the column direction, but in contrast, in the present exemplary embodiment, the encapsulation layer 390 is formed of the bar shape extending in the row direction.

The encapsulation layer 390 is formed at the first valley V1 and may be formed to overlap the edge of the microcavity 305. The encapsulation layer 390 may overlap the edge of the microcavity 305 including the injection holes 307a and 307b. The encapsulation layer 390 does not overlap the microcavity 305 except for the edge of the microcavity 305. The encapsulation layer 390 does not overlap the center of the microcavity 305. The encapsulation layer 390 includes the portion overlapping the microcavity 305 and an opening 395 formed at the second valley V2. The encapsulation layer 390 is not formed on the entire region of the substrate 110, and is patterned to remove the portion overlapping the microcavity 305.

A light blocking member 220 is formed on the encapsulation layer 390. The light blocking member 220 may be formed at the first valley V1 and the second valley V2, thereby forming the mesh shape. In the present exemplary embodiment, the encapsulation layer 390 is only formed at the first valley V1 such that the light blocking member 220 has the different plane shape from the encapsulation layer 390.

A color filter 230 is formed on the roof layer 360 to overlap each microcavity 305. A plurality of color filters 230 are not overlapped to each other. The color filter 230 is enclosed by the light blocking member 220, and the edge of the color filter 230 and the edge of the light blocking member 220 may overlap each other.

Next, a display device according to an exemplary embodiment will be described with reference to FIG. 11 and FIG. 12.

Figure 11:
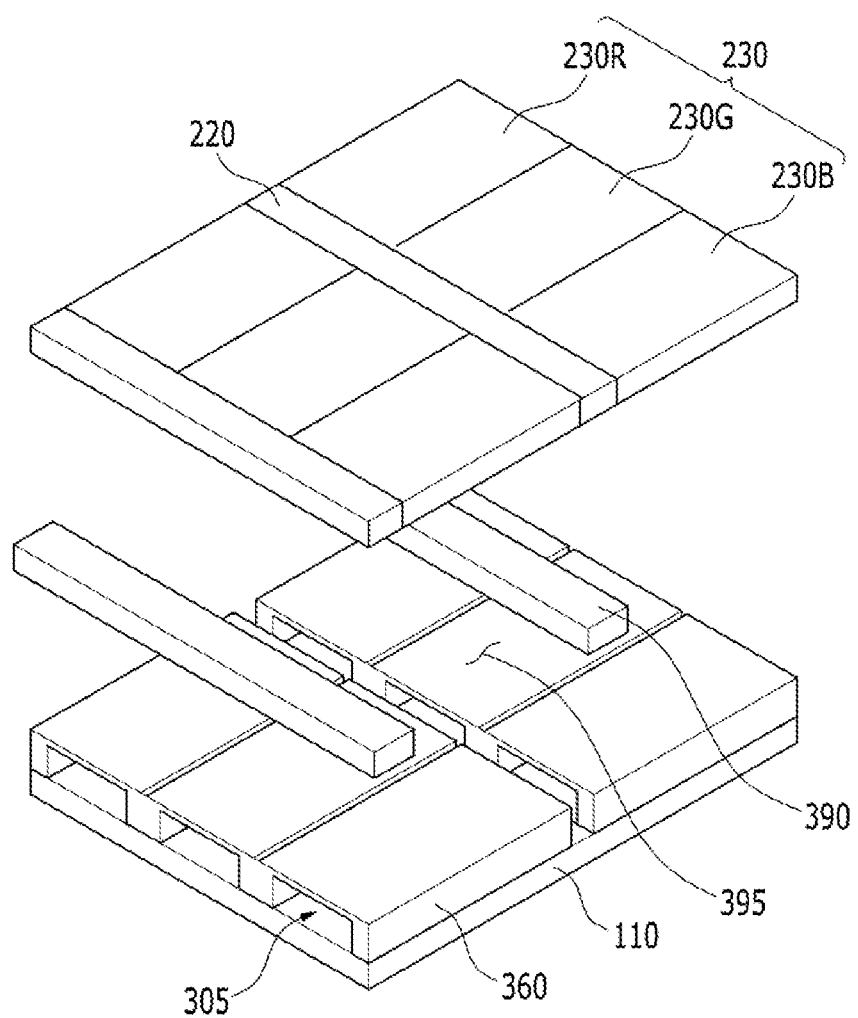
FIG. 11 is an exploded perspective view of a display device according to an exemplary embodiment.
Figure 12:
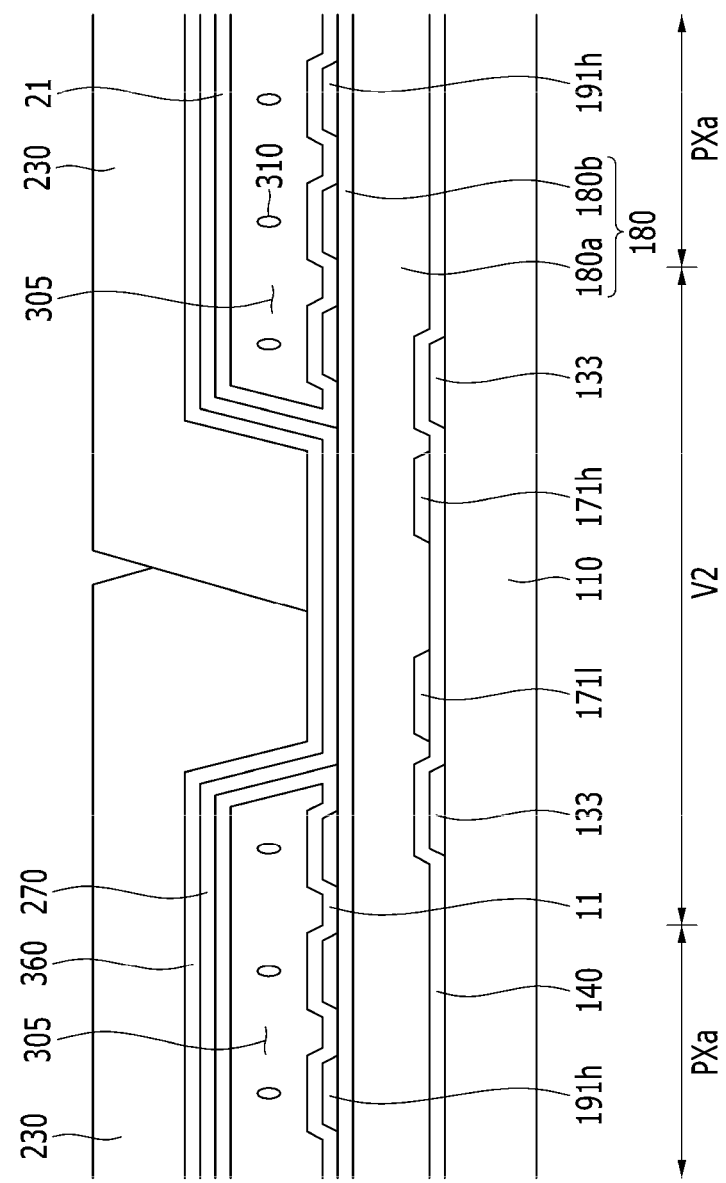
FIG. 12 is a cross-sectional view of a display device according to an exemplary embodiment.

The display device according to the exemplary embodiment shown in FIG. 11 and FIG. 12 is almost the same as the display device according to an exemplary embodiment shown in FIG. 7 to FIG. 10 such that the description thereof is omitted. In the present exemplary embodiment, the light blocking member is formed of the bar shape, differently from the previous exemplary embodiment, and it will be described in detail.

FIG. 11 is an exploded perspective view of a display device according to an exemplary embodiment, and FIG. 12 is a cross-sectional view of a display device according to an exemplary embodiment.

The encapsulation layer 390 may be formed at the first valley V1 and may be formed of the bar shape.

A light blocking member 220 is formed on the encapsulation layer 390. The light blocking member 220 is formed at the first valley V1 and may be made with the bar shape. The light blocking member 220 may have substantially the same plane shape as the encapsulation layer 390.

A color filter 230 is formed on the roof layer 360 to overlap each microcavity 305. The color filter 230 may include a first color filter 230R, a second color filter 230G, and a third color filter 230B.

The first color filter 230R and the second color filter 230G overlap each other. The edge of the first color filter 230R and the edge of the second color filter 230G overlap each other. The first color filter 230R and the second color filter 230G overlap each other at the second valley V2. By the overlapping of the first color filter 230R and the second color filter 230G, an empty space may not be formed between the first color filter 230R and the second color filter 230G, and may prevent generating a step.

Likewise, the second color filter 230G and the third color filter 230B overlap each other at the second valley V2. Also, the third color filter 230B and the first color filter 230R overlap each other at the second valley V2.

Next, a display device according to an exemplary embodiment will be described with reference to FIG. 13 to FIG. 15.

Figure 13:
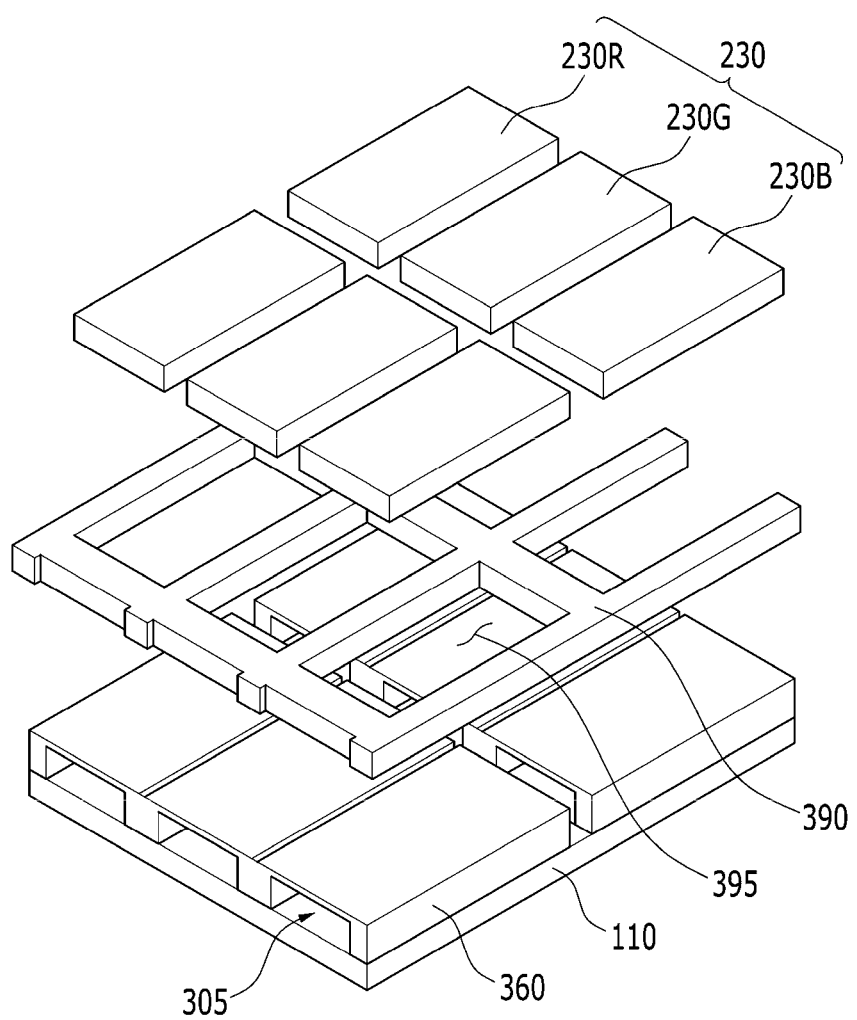
FIG. 13 is an exploded perspective view of a display device according to an exemplary embodiment.
Figure 14:
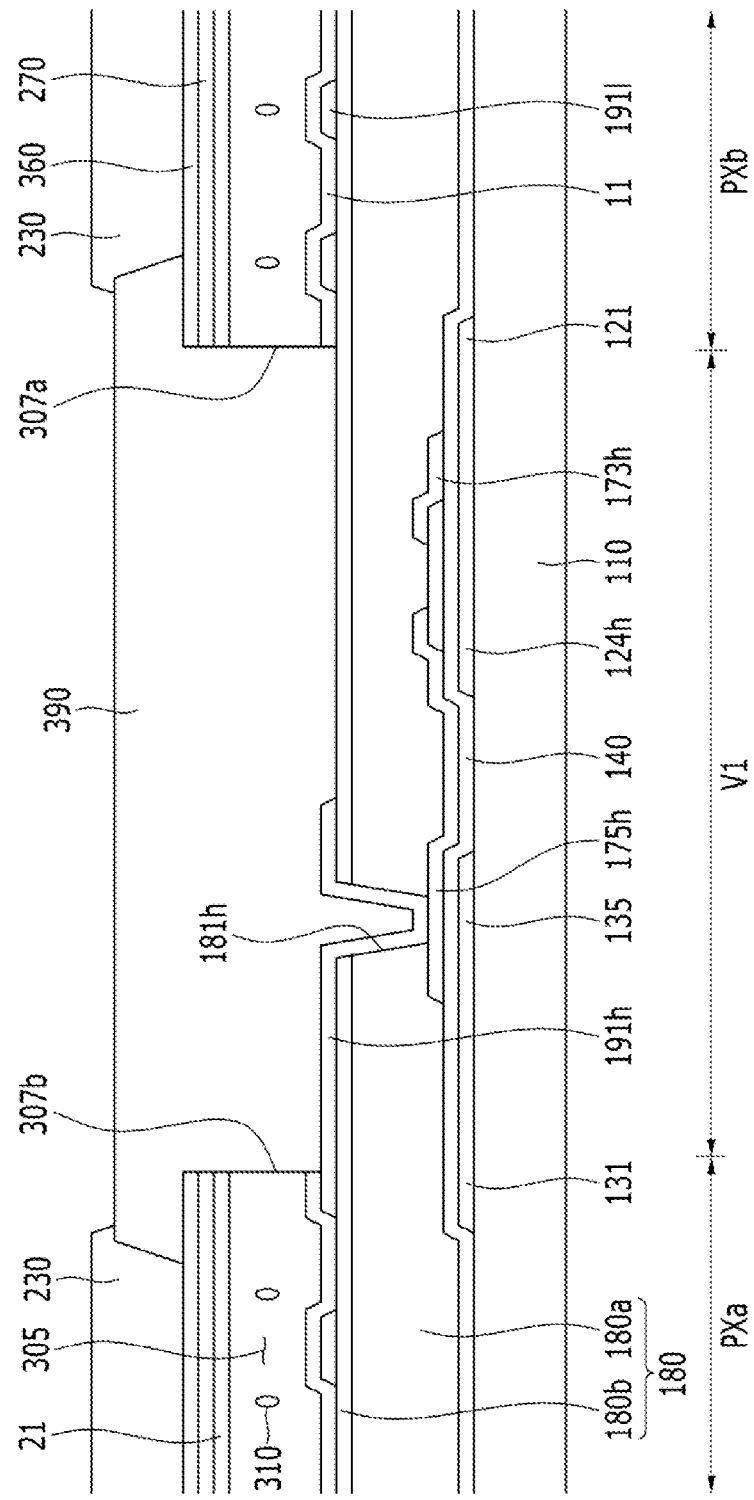
FIG. 14 and FIG. 15 are cross-sectional views of a display device according to an exemplary embodiment.
Figure 15:
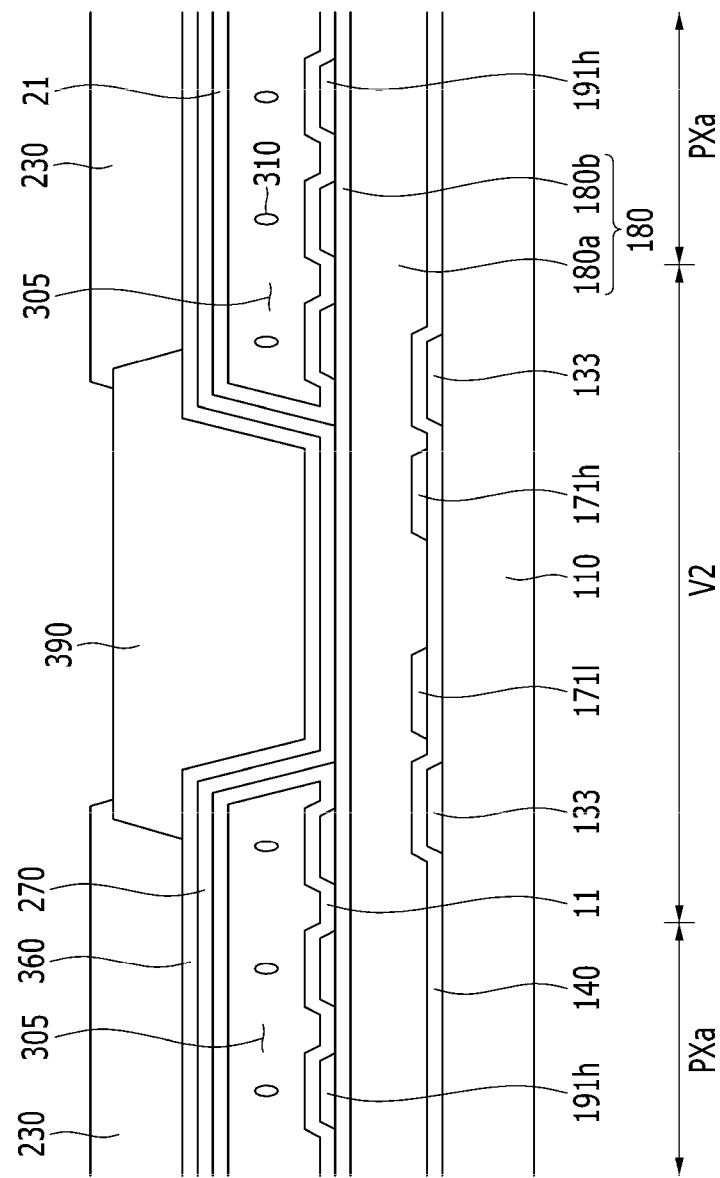

The display device according to the exemplary embodiment shown in FIG. 13 to FIG. 15 is almost the same as the display device according to an exemplary embodiment shown in FIG. 1 to FIG. 6 such that the description thereof is omitted. In the present exemplary embodiment, the light blocking member is not formed, differently from the previous exemplary embodiment, and it will be described in detail.

FIG. 13 is an exploded perspective view of a display device according to an exemplary embodiment, and FIG. 14 and FIG. 15 are cross-sectional views of a display device according to an exemplary embodiment. FIG. 14 and FIG. 15 are the cross-sectional views taken along different lines.

The encapsulation layer 390 may be formed at the first valley V1 and the second valley V2 and have the mesh shape.

The encapsulation layer 390 is formed of the light blocking material thereby preventing the light leakage. The encapsulation layer 390 may prevent the light leakage such that a separate light blocking member is not formed in the present exemplary embodiment.

In the previous exemplary embodiment shown in FIG. 2, the encapsulation layer 390 is formed at the first valley V1 and the second valley V2, and the light blocking member is formed on the encapsulation layer 390. In the present exemplary embodiment, the encapsulation layer 390 is made of the light blocking material such that the light leakage may be prevented while omitting the light blocking member.

A color filter 230 is formed on the roof layer 360 to overlap each microcavity 305. A plurality of color filters 230 are not overlapped with each other. The color filter 230 is enclosed by the encapsulation layer 390, and the edge of the color filter 230 and the edge of the encapsulation layer 390 may overlap each other.

Next, a display device according to an exemplary embodiment will be described with reference to FIG. 16.

Figure 16:
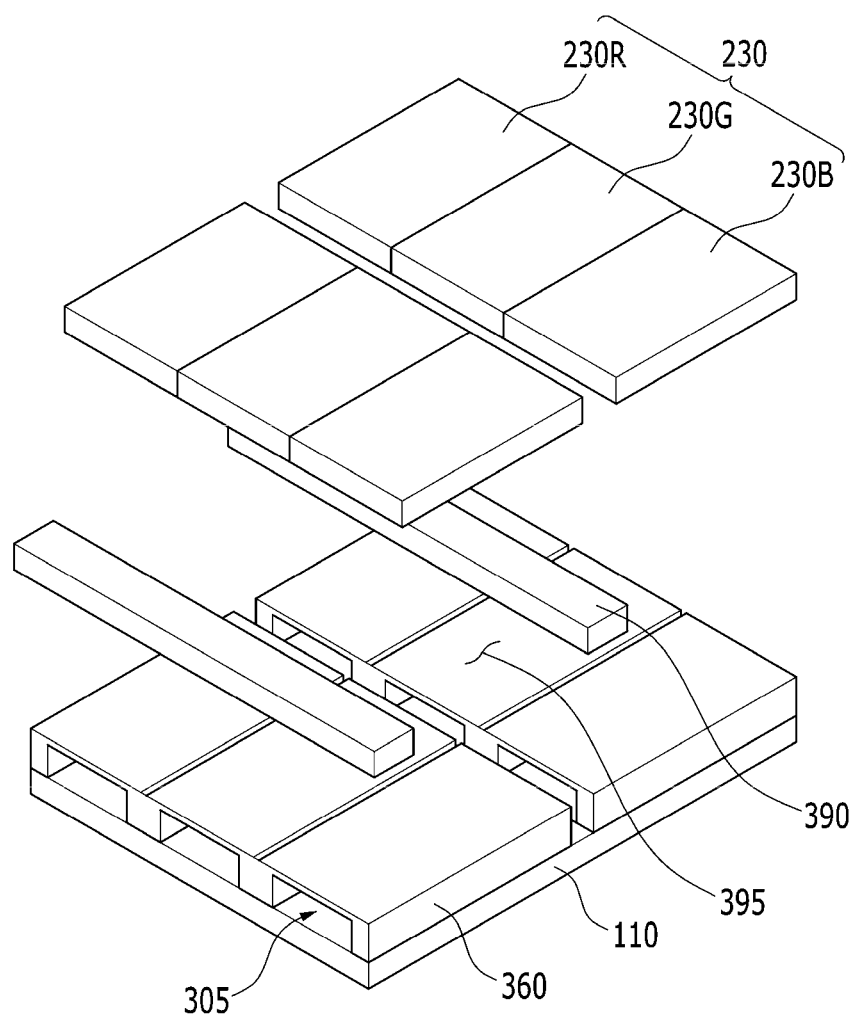
FIG. 16 is an exploded perspective view of a display device according to an exemplary embodiment.

The display device according to the exemplary embodiment shown in FIG. 16 is almost the same as the display device according to an exemplary embodiment shown in FIG. 13 to FIG. 15 such that the description thereof is omitted. In the present exemplary embodiment, the encapsulation layer is formed of the bar shape, differently from the previous exemplary embodiment, and it will be described in detail.

FIG. 16 is an exploded perspective view of a display device according to an exemplary embodiment.

In the previous exemplary embodiment, the encapsulation layer 390 is formed of the mesh shape to be crossed in the row direction and the column direction, but in contrast, in the present exemplary embodiment, the encapsulation layer 390 is formed of the bar shape extending in the row direction.

The encapsulation layer 390 is formed at the first valley V1. The encapsulation layer 390 is formed of the light blocking material thereby preventing the light leakage. The encapsulation layer 390 may prevent the light leakage such that a separate light blocking member is not formed in the present exemplary embodiment.

A color filter 230 is formed on the roof layer 360 to overlap each microcavity 305. The color filter 230 may include the first color filter 230R, the second color filter 230G, and the third color filter 230B.

The first color filter 230R and the second color filter 230G may overlap each other at the second valley V2, the second color filter 230G and the third color filter 230G may overlap each other at the second valley V2, and the third color filter 230G and the first color filter 230R may overlap each other at the second valley V2.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of Symbols>

| | |
|---|---|
| 11: first alignment layer | 21: second alignment layer |
| 110: substrate | 121: gate line |
| 124h: first gate electrode | 124l: second gate electrode |
| 131: storage electrode line | 133, 135: storage electrode |
| 154h: first semiconductor | 154l: second semiconductor |
| 171: data line | 173h: first source electrode |
| 173l: second source electrode | 175h: first drain electrode |
| 175l: second drain electrode | 180: passivation layer |
| 181h: first contact hole | 181l: second contact hole |
| 191: pixel electrode | 220: light blocking member |
| 230: color filter | 270: common electrode |
| 305: microcavity | 307a: first injection hole |
| 307b: second injection hole | 310: liquid crystal molecule |
| 360: roof layer | 390: encapsulation layer |
| 395: opening | |

What is claimed is:

1. A display device comprising:
a substrate;
a thin film transistor disposed on the substrate;
a pixel electrode disposed on the thin film transistor;
a common electrode disposed on the pixel electrode and separated from the pixel electrode via a microcavity therebetween;
a liquid crystal layer disposed in the microcavity; and
an encapsulation layer configured to cover the microcavity,
wherein the encapsulation layer has an opening positioned at a portion overlapping the microcavity.

2. The display device of claim 1, wherein
the microcavity is disposed in a matrix shape,
a first valley is disposed between microcavities adjacent in a column direction, and
a second valley is disposed between microcavities adjacent in a row direction.

3. The display device of claim 2, wherein
the encapsulation layer is disposed at the first valley and the second valley.

4. The display device of claim 3, wherein
the encapsulation layer has a mesh shape.

5. The display device of claim 4, further comprising
a light blocking member disposed on the encapsulation layer.

6. The display device of claim 5, wherein
the light blocking member has substantially the same plane shape as the encapsulation layer.

7. The display device of claim 6, further comprising
a color filter disposed on the common electrode.

8. The display device of claim 7, wherein
the color filter is enclosed by the light blocking member and the encapsulation layer.

9. The display device of claim 2, wherein
the encapsulation layer is disposed at the first valley.

10. The display device of claim 9, wherein
the encapsulation layer has a bar shape.

11. The display device of claim 10, further comprising
a light blocking member disposed on the encapsulation layer.

12. The display device of claim 11, wherein
the light blocking member is disposed at the first valley and the second valley.

13. The display device of claim 12, wherein
the light blocking member has a mesh shape.

14. The display device of claim 11, wherein
the light blocking member is disposed at the first valley.

15. The display device of claim 14, wherein
the light blocking member has substantially the same plane shape as the encapsulation layer.

16. The display device of claim 15, further comprising
a color filter disposed on the common electrode,
wherein the color filter includes a first color filter and a second color filter, and
the first color filter and the second color filter overlap each other at the second valley.

17. The display device of claim 2, wherein
the encapsulation layer comprises a light blocking material.

18. The display device of claim 17, wherein
the encapsulation layer is disposed at the first valley and the second valley, and has a mesh shape.

19. The display device of claim 17, wherein
the encapsulation layer is disposed at the first valley and has a bar shape.

20. The display device of claim 1, wherein
the encapsulation layer comprises a material including a photosensitive organic material.

* * * * *